INVENTOR.
JAMES URBAN DALY
BY
ATTORNEY

March 17, 1964     J. U. DALY     3,125,111
VACUUM REGULATOR
Filed Feb. 6, 1962     3 Sheets-Sheet 3
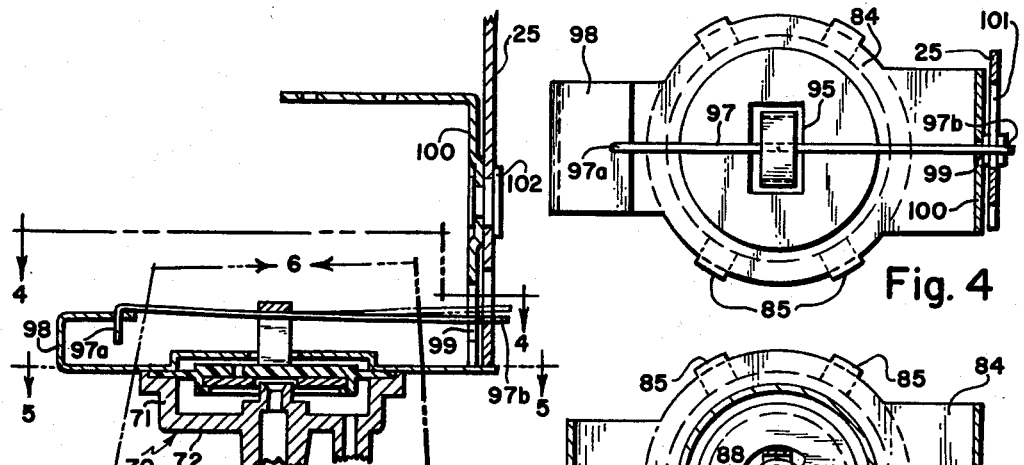
Fig. 3
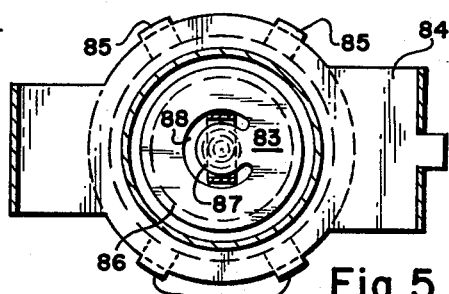
Fig. 4
Fig. 5
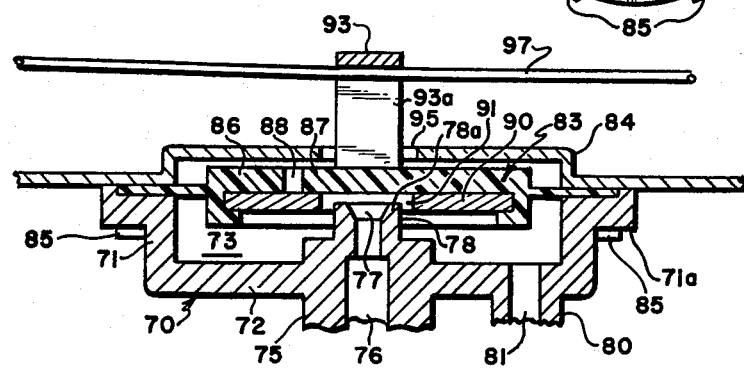
Fig. 6
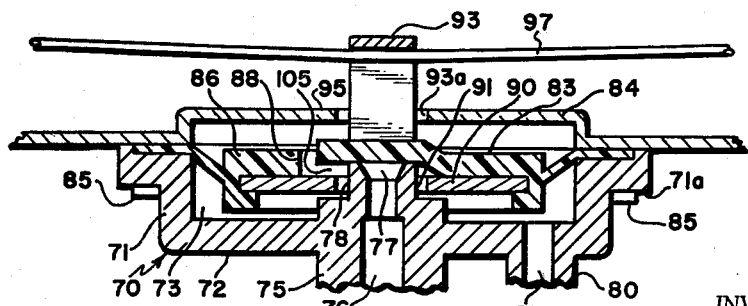
Fig. 7
INVENTOR.
JAMES URBAN DALY
BY
ATTORNEY United States Patent Office 3,125,111
Patented Mar. 17, 1964

3,125,111
VACUUM REGULATOR
James Urban Daly, Columbus, Ohio, assignor to Ranco Incorporated, Columbus, Ohio, a corporation of Ohio
Filed Feb. 6, 1962, Ser. No. 171,419
4 Claims. (Cl. 137—102)

This invention relates to improvements in vacuum regulators, and more particularly to vacuum regulators which are useful to convert an irregularly varying vacuum, from a source such as the intake manifold of an automobile engine, to a predetermined relatively constant level of vacuum useful for operating vacuum powered devices and appliances such as a fluid control valve of an automobile passenger compartment heater.

It is a principal object of this invention to provide a novel vacuum regulator which is simple of construction and reliable in operation and which maintains a selected constant vacuum from a fluctuating vacuum source, the regulator comprising a chamber having ports for communication with the source of vacuum and with a vacuum operated device, and diaphragm means forming a wall of the chamber subjected to a pressure differential between the interior and exterior of the chamber and movable in response to changes in this pressure differential to close and open the port communicating with the source to thereby automatically control the vacuum pressure in the chamber, the diaphragm having an opening therethrough closed by a flat valve member carried by the diaphragm so that continued flexing of the diaphragm after engagement with the vacuum port due to low vacuum pressure causes separation of the flat valve member and the diaphragm to admit atmosphere to the chamber through the opening in the diaphragm.

Another object of this invention is the provision of a vacuum regulator of the above-mentioned character having novel adjustable biasing means to regulate the pressure differential at which the diaphragm means engages the port.

Still another object of this invention is the provision of an improved vacuum regulator comprising a body defining a chamber having an inlet port and an outlet port with the outlet port defined in a boss extending into the chamber, and a flexible diaphragm means for controlling the state of vacuum in the chamber by closing off or opening the outlet port and by bleeding atmospheric air into the chamber, the diaphragm means comprising an annular web portion surrounding a tongue portion separated from the web portion by an opening therebetween with the tongue portion overlying the outlet port, and a plate normally bridging the opening between the tongue and web portions, the web portion being adapted to flex relative to the tongue portion to disengage edges of the opening through the diaphragm from the plate and thereby provide a bleed opening for admitting air into the chamber whenever the vacuum therein exceeds the predetermined desired level. Preferably, the web and tongue portions of the diaphragm means are integrally molded as a single part formed of resilient material such as rubber.

As another object this invention aims to provide an improved vacuum regulator including biasing means acting on the diaphragm so as to determine the degree of vacuum in the chamber which will effect closing of the outlet port and opening of the atmospheric bleed passage, the biasing means comprising a spring arm pivoted at one end and positioned by a cam at the other end, and connected between its ends to the diaphragm means whereby the spring arm may be bowed by positioning of the cam to provide a predetermined biasing effect on the diaphragm means.

The invention further resides in certain constructions and arrangements of parts, the objects and advantages of which will become apparent from the following detailed description of a presently preferred embodiment of the invention taken in conjunction with the accompanying sheets of drawings forming a part of this specification, and in which—

FIG. 3 is a fragmentary sectional view of the vacuum regulator taken substantially along line 3—3 of FIG. 2, FIG. 4 is a sectional view of the regulator taken along line 4—4 of FIG. 3;

FIG. 5 is a sectional view of the regulator taken along line 5—5 of FIG. 3;

FIG. 6 is an enlarged fragmentary sectional view similar to FIG. 3, and

FIG. 7 is a view similar to FIG. 6 but showing parts in different operative positions.

Figure 1:
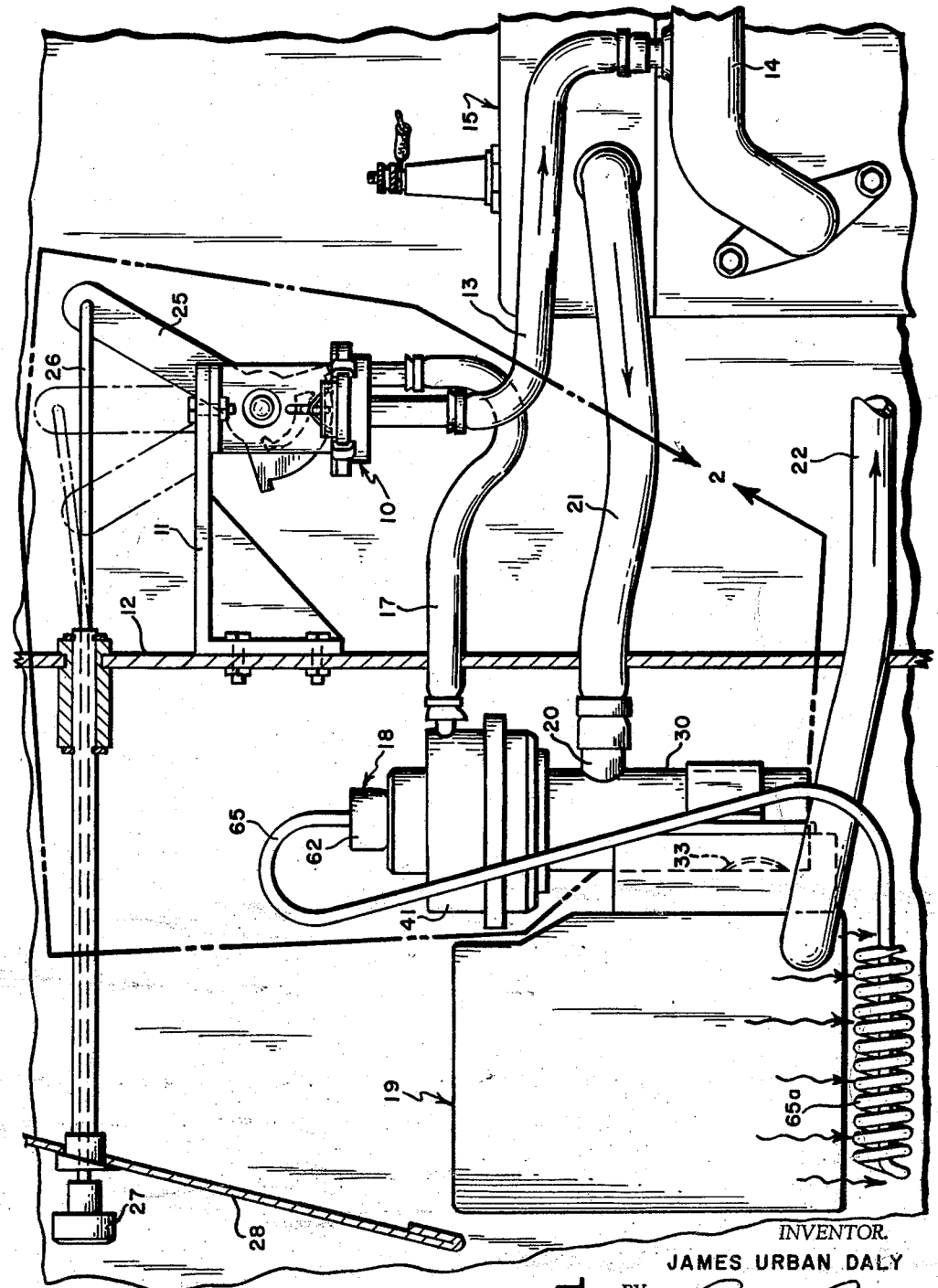
FIG. 1 illustrates a vacuum regulator embodying this invention shown in association with an automobile heating system including a vacuum operated valve.
Figure 2:
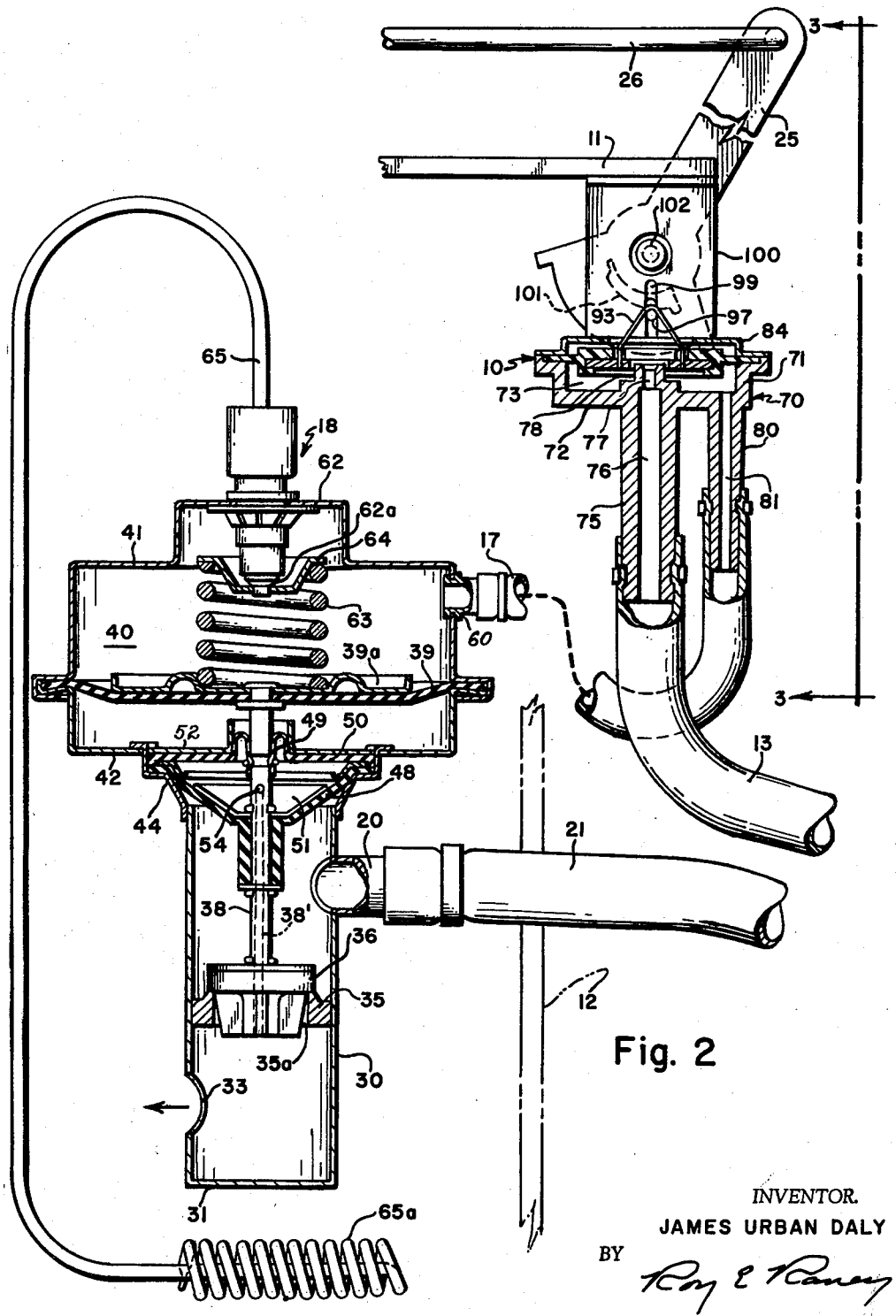
FIG. 2 is a vertical sectional view of the regulator and valve of FIG. 1.

In the form of the invention illustrated in the drawings, there is provided a vacuum regulator 10 which, by way of example, is shown in association with a passenger compartment heating system of an automobile. Thus, in FIG. 1, vacuum regulator 10 is shown mounted by a bracket 11 to the forward side of a fire wall 12 of an automobile, and is connected by a tube 13 to the intake manifold 14 of an automobile internal combustion engine 15. Vacuum regulator 10 is connected by a tube 17 to a vacuum powered, thermostatically controlled, hot water control valve 18 of an automobile heater 19. Valve 18 has an inlet pipe 20, connected by a hose 21 to the water jacket of engine 15, and serves to control the flow of hot water into the heat exchanger core of heater 19. Water is drawn from the core of heater 19 and is returned to the intake side of the water circulating pump (not shown) of the engine cooling system through a hose 22.

Engine manifold 14 serves as a source of vacuum which normally varies between five and twenty-five inches of mercury depending upon the load and throttle conditions under which the engine is operating. Vacuum regulator 10 serves to convert this varying vacuum to a constant vacuum of a predetermined value for use in operating apparatus such as the vacuum powered valve 18 which is thermostatically controlled to maintain the air passed into the passenger compartment of the automobile at a desired temperature. Vacuum regulator 10, described more fully hereinafter, comprises a control arm 25 which may be manually moved by means of a Bowden wire 26 connected to a hand knob 27 at the dashboard 28 of the automobile to select the vacuum which is applied to valve 18, and hence to select the temperature of the air which heater 19 passes into the passenger compartment.

Vacuum powered, thermostatically controlled valve 18, which is the subject of a separate application Serial Number 178,415, filed March 8, 1962, and assigned to the assignee of this application, comprises a tubular body 30 closed at the bottom 31 and into which inlet pipe 20 leads. An outlet port 33 is adapted to be aligned with an inlet port in a heater core with an annular gasket (not shown) disposed between the core and body 30. An annular seat 35 is located in body 30 between inlet 20 and outlet port 33, and a valve member 36 is movable into and out of engagement with seat 35 to control the flow of hot water through the valve body into heater 19. Valve member 36 is mounted on a valve stem 38 which is connected to a flexible diaphragm 39 forming one wall of a vacuum chamber 40 defined principally by a dome 41. A backing plate 39a is conveniently secured to diaphragm 39 by upsetting of the end of stem 38, as shown. Dome 41 is assembled on a cup shaped member 42 by crimping, as shown, with the peripheral edge of diaphragm 39 therebetween. Cup shaped member 42 is mounted on tubular valve body 30 by means of an annular coupling member 44.

Valve stem 38 passes through a flexible wall 48, mounted in coupling member 44, and through a flexible sealing neck 49 or a wall 50. Walls 48 and 50 define an annular chamber 51 therebetween, and a plate 52 prevents outward movement of the major portion of wall 50. Stem 38 has an axial passage 38' therein leading from the downstream side of valve member 36 through a port 54 opening in chamber 51 between walls 48 and 52. This construction provides a balancing effect which prevents the position of valve member 36 from being influenced by differences in pressure existing in the system above and below the valve member. Thus, a relatively low pressure below valve member 36 tending to move the valve member toward seat 35 will be counterbalanced by the transmittal of the same low pressure through passage 38' to chamber 51 and tending to move wall 48 and valve member 36 away from seat 35. This balancing feature in a control valve is more fully described in United States patent application Serial Number 786,584, now Patent No. 3,018,084 assigned to the assignee of this application.

Dome 41 has an outlet or vacuum connection 60 from which tube 17 leads to vacuum regulator 10. The drawing of a vacuum in chamber 40 under the control of regulator 10, will move diaphragm 39, plate 39a, stem 38, and valve member 36 upwardly as viewed in the drawings, thereby opening port 35a.

Such upward movement of diaphragm 39 is opposed by a temperature responsive means including an expansible power element 62 mounted on the end wall of dome 41 and acting through a spring 63 disposed between plate 39a and a seat 64 carried on the movable portion 62a of power element 62. Expansible power element 62, which is preferably of the type disclosed in United States Patent Number 2,843,151, is connected to a capillary tube 65 which terminates in a coiled temperature sensing portion 65a. Power element 62, capillary tube 65, and the sensing portion 65a thereof, contain a suitable fluid which expands and contracts upon increases and decreases in temperature, thereby causing corresponding expansion and contraction of the power element. Sensing element 65a is preferably located at the hot air discharge side of heater 19 so that the movable portion 62a of the power element will be positioned in accordance with the temperature of air being discharged.

It will be recognized that increases in vacuum in chamber 40 will tend to open valve 18 while increases in temperature at sensing coil 65a will tend to close the valve. This opposing of forces is utilized to maintain a selected temperature of the air which is discharged from heater 19, the selection being accomplished by adjusting vacuum regulator 10 to provide a predetermined vacuum in chamber 40 which will cause valve member 36 to open and hot water to be admitted to heater 19 for raising the temperature of air passing therethrough. As the temperature of the air increases, power element 62 expands causing spring 63 to be compressed and to move valve member 36 toward seat 35. As the temperature of the air increases gradually to the desired temperature, valve member 36 will gradually restrict the flow of hot water until only that quantity of water passes as is necessary to maintain the desired air temperature.

If a high temperature is then desired, regulator 10 is adjusted to increase the vacuum in chamber 40 thereby moving valve member 36 to increase the flow of hot water until the temperature of the air reaches the higher desired temperature and power element 62 expands and causes valve member 36 to be moved to a position which passes only that amount of hot water required to maintain the new temperature. Thus, the temperature of air discharged from heater 19 may be selected by moving hand knob 27 to adjust the vacuum maintained in chamber 40 by regulator 10, the construction of which will now be described in greater detail.

Vacuum regulator 10 comprises a body 70 having an annular side wall 71 and a bottom wall 72 defining a generally cylindrical chamber 73. Body 70 is provided with a tubular outlet pipe 75 which is adapted to be connected to a source of vacuum such as manifold 14 by a tube 13, and which outlet pipe has a passage 76 communicating with chamber 73 through an outlet port 77 formed in an annular boss 78 extending into chamber 73 and presenting a seat 78a around port 77. A second or inlet pipe 80, having an inlet passage 81, serves to place chamber 73 in communication with a vacuum powered apparatus such as valve 18 when a tube such as tube 17 is connected therebetween.

Chamber 73 is defined, on the side opposite wall 72, by a movable diaphragm means 83, the periphery of which is clamped between the edge of annular body wall 71 and a cover member 84 having tabs 85 crimped around a flange 71a of body member 70.

Diaphragm means 83 comprises a thickened central web portion 86 surrounding a tongue portion 87 which is defined by a generally C-shaped opening 88, with tongue portion 87 overlying seat 78a of outlet port 77. An annular plate 90, having a central opening 91, is seated in the thickened portion 86 of diaphragm means 83 and normally bridges opening 88 and surrounds outlet boss 78. A U-shaped bail 93 has its leg portions 93a extending through opening 88 and secured to plate 90. Bail 93 extends through a rectangular opening 95 in cover 84 and is adapted to be biased upwardly by a bowed spring wire arm 97. Spring arm 97 has a downturned end 97a engaged in an opening in a U-shaped projection 98 of cover 84 and has its other end 97b extending through a guide slot 99 of a bracket member 100 and engaged in an arcuate cam slot 101 of control arm 25. Control arm 25, which is pivoted by pivot means 102 to bracket member 100, secured to cover 84 is movable by control knob 27 to cause spring arm end 97b to follow cam slot 99 so as to vary the upward biasing force on bail 93, plate 90, and diaphragm means 83 to select the vacuum condition which will be established within chamber 73 and the vacuum powered means such as valve 18 connected thereto.

When connecting pipe 75 is connected to a source of vacuum such as manifold 14 and arm 25 is adjusted to select a desired vacuum condition at connecting pipe 80, a vacuum will be drawn in chamber 73 causing diaphragm means 83 and plate 90 to overcome the biasing effects of spring arm 97 and to move inwardly toward seat 78a. The biasing effect of spring arm 97 is so chosen that tongue 87 will engage seat 78a and close off outlet port 77 when the vacuum in chamber 73 attains the desired value.

In the present example, wherein regulator 10 is connected to a vacuum powered valve such as 18, the tongue 87 will close port 77 when the desired vacuum has been attained in the inter-communicating chambers 40 and 73, thereby operating valve member 36 to an opened position as explained heretofore.

As the air emanating from heater 19 raises the temperature of sensing portion 65a of capillary 65, power element 62 will expand in the earlier described manner causing spring 63 to depress diaphragm 39 and position valve member 36 so as to pass just enough water to maintain the desired temperature. It will be recognized that the depression of diaphragm 39 by power element 62 will cause an increase in the volume of communicating chambers 40 and 73.

In order to maintain the selected degree of vacuum in the chambers, it is necessary to permit the admission of air thereinto as the volume increases. Accordingly, as diaphragm 39 is moved downwardly tending to cause a corresponding increase in vacuum in chambers 40 and 73, the web portion 86 of diaphragm means 83 will be caused to move inwardly carrying plate 90 therewith, while tongue portion 87 is held stationary by engagement against seat 78a as shown in FIG. 7. This movement of web portion 86 and plate 90 opens an atmospheric air bleed passage 105 which may be traced through opening 88, between tongue 87 and plate 90, and through opening 91 into chamber 73. It is to be understood that the degree of opening shown in FIG. 7 is exaggerated. This passage will permit the entrance of sufficient air to maintain the vacuum in chambers 73 and 40 at the selected value. Bleed passage 105 will be opened at any time that the vacuum in chamber 73 exceeds the value selected by positioning of arm 25 and spring 97, for example when arm 25 is positioned to select a lower value of vacuum than that existing in chamber 73.

It will be recognized that the regulator 10 will operate to maintain the vacuum in chamber 40 at any predetermined value within the range of operation of the apparatus, although the source of vacuum may vary widely. Cam slot 99 has a stepped portion 99a which causes spring 97 to be pulled upwardly with sufficient force to clamp diaphragm means 83 against the top wall of cover 84 thereby preventing the regulator from functioning in the aforedescribed manner and placing the vacuum source in direct and constant communication with chamber 40. This condition will maintain valve 18 in a fully opened condition when the maximum possible heat is desired from the heater 19. Conversely, the other end of cam slot 99 has a stepped portion 99b which releases spring arm 97 from all biasing action on bail 93 and allows diaphragm means 83 to close outlet port 77 in response to a minimum degree of vacuum in chamber 73 which is less than that required to open valve 18, regardless of the temperature at coil 65a. This condition corresponds to the "off" or no heat position of knob 27.

From the foregoing detailed description of a vacuum regulator embodying the invention, it will be appreciated that there has been provided thereby a particularly effective regulator which, by reason of the novel construction thereof including the diaphragm means which opens a bleed passage therethrough for the admission of atmospheric air when a desired vacuum condition is exceeded, achieves accurate regulation with a minimum of inexpensively formed parts. It will also be appreciated that the adjustable regulator of this invention is simple and economical in construction, has few moving parts to wear or become misaligned, and may be easily adjusted to select a desired vacuum condition.

Although the invention has been described in considerable detail and with reference to a specific vacuum regulator embodying the invention, it will be understood that the invention is not limited thereby, but rather the invention includes all those adaptations, modifications, substitutions, and uses as are reasonably embraced by the scope of the claims hereof.

Having described my invention, I claim:

1. A vacuum regulator comprising:
    (a) a body defining a chamber having inlet and outlet ports for connection to vacuum operated apparatus and a vacuum source respectively,
    (b) said outlet port being defined in a boss projecting inwardly of said chamber from one wall thereof,
    (c) flexible diaphragm means defining a wall of said chamber and movable toward and away from said outlet port in response to decreases and increases in pressure in said chamber,
    (d) said flexible diaphragm means comprising an annular web portion surrounding a central tongue portion defined by an opening therebetween, with said tongue portion overlying said outlet port,
    (e) a rigid plate disposed against the chamber facing surface of said diaphragm means and bridging said tongue defining opening,
    (f) said plate being movable with said diaphragm means and having a central opening adapted to receive said boss to permit movement of said diaphragm means to bring said tongue portion into and out of closing engagement with said outlet port, and
    (g) biasing means resiliently urging said plate and diaphragm means outwardly of said chamber.

2. A vacuum regulator as defined in claim 1 and wherein said biasing means comprises:
    (a) a spring arm pivoted at one end to said body and having the other end adjustably positioned by cam means on said body,
    (b) said plate being connected to said spring arm between the ends thereof whereby said arm may be bowed by said cam means to produce a selected biasing effect on said plate and diaphragm means.

3. A vacuum regulator as defined in claim 2 and comprising a cover member between said spring arm and said diaphragm means, said cam means being operative to move said spring arm so as to clamp said diaphragm means between said plate and said cover member, whereby said diaphragm means may be rendered immovable regardless of the vacuum in said chamber.

4. A vacuum regulator comprising:
    (a) a body defining a chamber having inlet and outlet ports for connection to vacuum operated apparatus and a vacuum source respectively,
    (b) said outlet port being defined in a boss projecting inwardly of said chamber from one wall thereof,
    (c) flexible diaphragm means defining a wall of said chamber and movable toward and away from said outlet port in response to decreases and increases in pressure in said chamber,
    (d) said flexible diaphragm means comprising an annular web portion surrounding a central tongue portion defined by a C-shaped opening, said tongue portion overlying said outlet port,
    (e) a rigid plate at least partially embedded in said diaphragm means and bridging said tongue defining C-shaped opening on the chamber facing side of said diaphragm means,
    (f) said plate being movable with said diaphragm means and having a central opening for receiving said boss to permit movement of said diaphragm means to bring said tongue portion into and out of said closing relation with said outlet port,
    (g) a cover member connected to said body and overlying said diaphragm means, said cover member having an opening therein,
    (h) a bail fixed to said plate and having leg portions extending through said C-shaped opening and through said opening in said cover member,
    (i) a spring arm having one end fixed at one side of said cover member and extending through said bail, and
    (j) adjustable means engaging the other end of said spring arm for bowing thereof against said bail to provide a selected biasing force on said plate and diaphragm means outwardly of said chamber.

References Cited in the file of this patent

UNITED STATES PATENTS

| | | |
|---|---|---|
| 1,450,052 | Smith | Mar. 27, 1923 |
| 2,370,582 | Rodway | Feb. 27, 1945 |